Dec. 15, 1925.    W. S. ROGERS    1,565,330
BALL BEARING
Filed Jan. 15, 1925
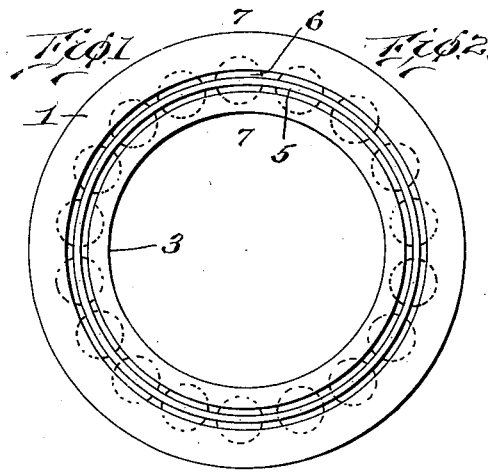
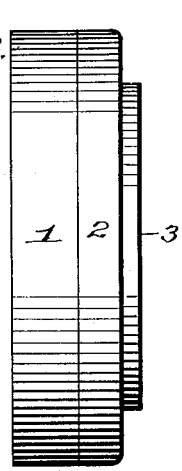
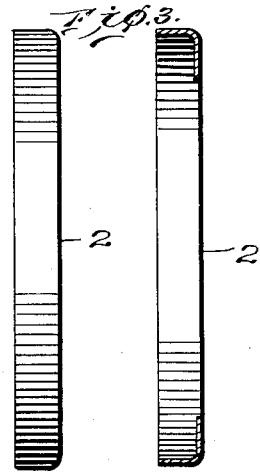
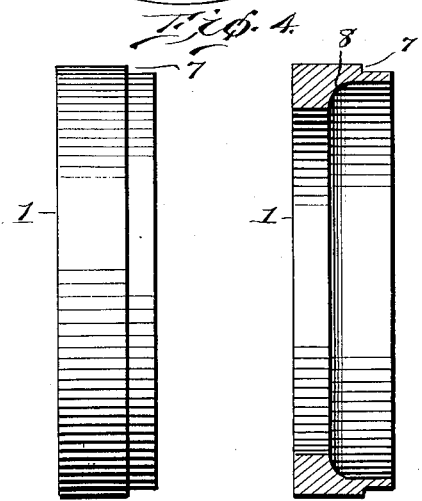
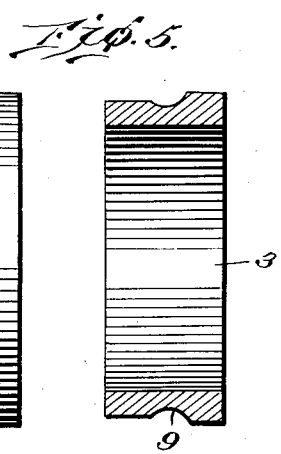
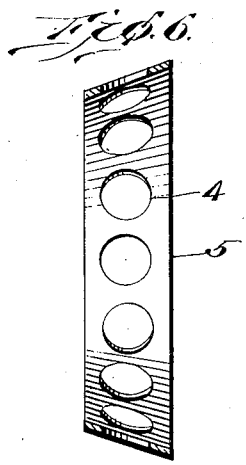
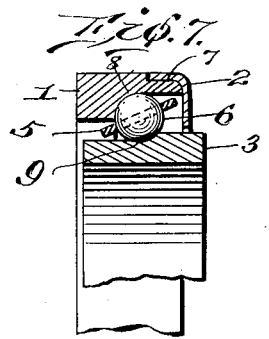

Patented Dec. 15, 1925.

1,565,330

UNITED STATES PATENT OFFICE.

WINFIELD S. ROGERS, OF BANTAM, CONNECTICUT, ASSIGNOR TO THE BANTAM BALL BEARING COMPANY, OF BANTAM, CONNECTICUT, A CORPORATION OF CONNECTICUT.

BALL BEARING.

Application filed January 15, 1925. Serial No. 2,572.

*To all whom it may concern:*

Be it known that I, WINFIELD S. ROGERS, a citizen of the United States, residing at Bantam, in the county of Litchfield and State of Connecticut, have invented certain new and useful Improvements in Ball Bearings, of which the following is a specification.

This invention relates to ball bearings, and more especially to that type which contains facilities for bearing a thrust load in addition to a capability for receiving radial pressure.

The principal object is to provide a combined radial and thrust bearing with an especially effective closure, that is more than ordinarily secure and durable. Another object is to provide a ball bearing that can be assembled only by a manufacturer possessing special facilities therefor and which is incapable of unintentional dismemberment. A further object is to provide a ball bearing that is easy to assemble and which requires no inspection after assembly. A still further object is to provide a ball bearing that requires no device for the retention of its bearing balls themselves.

To accomplish these objects, I have provided an outer bearing ring containing an inner annular ball-race, one portion of said outer rig being annularly thicker than the other portion, said thicker portion forming an annular shoulder for said ball-race so as to form a bearing for the balls at approximately one-third of their circumference. Said outer ring is exteriorly annularly inset at the periphery of its thinner edge, and a pressed steel flanged ring whose inner diameter is less than the outer diameter of said inset portion, is made to exactly fit said inset by a process of heat-expansion of said ring and its subsequent shrinking into position on said inset portion of said outer bearing-ring. The flanged portion of said flanged ring provides a cover which holds the balls in place. The inner bearing-ring or spool is also thicker at one portion of its annular width, the added thickness producing a shoulder which somewhat projects over the said balls, on the side opposite to the race just described, thus affording a modified thrust-bearing for that side also.

In the drawings, Figure 1 is a rear section view of the assembled device; Figure 2 is an edge view of the same; Figure 3 is an edge and sectional view of the flanged ring or cap; Figure 4 is an edge and sectional view of the outer bearing ring; Figure 5 is an edge and sectional view of the inner bearing ring or spool; Figure 6 is a sectional view of a ball-spacer of familiar design; and Figure 7 is a cross-section taken on the line 7—7 of Figure 1.

The numeral 1 represents the outer bearing-ring, 8 the race-way therein, 7 its reduced portion or inset, 2 the flanged ring or cap, 3 the inner bearing-ring or spool, 5 a ball-spacer, 4 the perforations therein, 6 the balls, and 9 the race-way on 3.

The ball-spacer 5 may be used if desired; but with this type of retainer the use of a spacer is unimportant.

It will be observed, from Figure 7, that the enlarged inner portion of the outer race-ring furnishes a portion of the race-way, thus rendering the device capable of bearing a thrust-load from one direction. It is also obvious that the enlarged outer portion of the inner bearing-ring 3 also provides a shoulder opposite to the one just described, giving added bearing-space to the race-way thereon.

From the foregoing, it will be seen that I have provided a perfect thrust-bearing, while the radical load is also well distributed. It is also apparent that an extremely tight and durable closure is effected, which cannot be unintentionally disturbed. The unique method herein described for retaining the balls and inner bearing-ring, combines strength, durability and neatness, to a high degree.

It is possible to force a flanged ring or cap into place as shown, by pressure means or by spinning; but such a process is faulty, in that metal so pressed or spun is liable to check, crack and split, or to be loosened from its seat by other means; and, it will be seen, the maximum of security is afforded by the positive method herein described, for the flanged ring or cap so attached is impossible of removal except by violence, and, after such removal, it would be unfit for re-use.

In assembling the device, after the installation of the bearing-balls 6, a simple test is possible by spinning them with a turn of the inner bearing-ring 3, after which no further inspection is required. The cap 2 is then placed in position, and the article is ready for use. This affords an economy which will be appreciated, as "inspection" is ordinarily one of the outstanding items in the expense of manufacturing such products.

Having fully described my invention, I claim:

1. A ball-bearing comprising an outer ring having an interior annular shoulder and a ball-race of which said shoulder forms a portion, the opposite edge of said outer ring exteriorly provided with an annular inset, an inner race-ring having an exterior annular shoulder and a ball-race of which said shoulder forms a portion, balls rotatable between said races, a flanged ring whose inner diameter is less than the outer diameter of said inset, said flanged portion, at a right-angle to its ring projecting over said balls, and said flanged portion being molecularly expanded by heat and shrunken to fit said inset portion of said outer bearing-ring, thus preventing the component members from being dis-assembled, and thereby forming a complete bearing unit.

2. A ball-bearing comprising an outer bearing-ring, an inner bearing ring, balls rotatable in races therebetween, said outer bearing-ring being annularly inset at the periphery of one edge thereof, a flanged ring the flanged portion of which is of less inner diameter than the exterior of said inset and capable of being heated and shrunken on said inset, and the ring portion projecting over said balls, so as to make a positive and permanent closure of said ball bearing and its component members.

3. A combined radial and thrust ball-bearing comprising an outer ring having an interior annular shoulder and a ball-race of which said shoulder forms a portion, the opposite edge of said outer ring exteriorly provided with an annular inset, an inner race-ring having an exterior annular shoulder and a ball-race of which said shoulder forms a portion, balls rotatable between said races, a flanged ring the flanged portion of which has an inner diameter less than the outer diameter of said inset, said flanged portion being at a right-angle to the portion projecting over the said balls, said flanged portion being molecularly expanded by heat and allowed to shrink-fit said inset portion of said outer race-ring so as to complete the positive and permanent assembly of the ball-bearing and its component parts, and to thereby provide an exterior whose diameter is uniform throughout.

In testimony whereof I have hereto affixed my signature.

WINFIELD S. ROGERS.